No. 837,679. PATENTED DEC. 4, 1906.
H. C. FRESHOUR.
METHOD OF MAKING BATH AND BASIN STOPPERS.
APPLICATION FILED SEPT. 12, 1906.

WITNESSES
H. A. Lamb.
S. W. Atherton.

INVENTOR
Henry C. Freshour
BY
A. M. Wooster
ATTORNEY

UNITED STATES PATENT OFFICE.

HENRY C. FRESHOUR, OF BRIDGEPORT, CONNECTICUT, ASSIGNOR TO THE H. O. CANFIELD COMPANY, OF BRIDGEPORT, CONNECTICUT, A CORPORATION OF CONNECTICUT.

METHOD OF MAKING BATH AND BASIN STOPPERS.

No. 837,679.　　　　　Specification of Letters Patent.　　　　　Patented Dec. 4, 1906.

Application filed September 12, 1906. Serial No. 334,275.

*To all whom it may concern:*

Be it known that I, HENRY C. FRESHOUR, a citizen of the United States, residing at Bridgeport, county of Fairfield, State of Connecticut, have invented a new and useful Method of Making Bath and Basin Stoppers, of which the following is a specification.

This invention relates to the manufacture of stoppers for bath-tubs, basins, &c., said stoppers comprising elastic bodies which are usually formed of a rubber compound, a stud being employed to enable the body to be attached to a chain.

The demands of the trade require that the studs shall be plated; but heretofore difficulty has been experienced in making entirely satisfactory stud-stoppers for several reasons. For instance, when the plastic body is molded with a cavity and one end of the stud afterward pushed into the cavity the permanency of the connection is not certain. The stud is liable to be pulled out of the body. When the plastic body is formed with a hole extending completely through it and one end of the stud then passed through the aperture and secured by a washer and screw or by heading down the end of the stud, there is always liable to be some leakage around the stud, because the body of the stud is nowhere continuous transversely. Another objection to this latter form of stopper is the increased expense of the washer or screw or the cost of the operation of heading down the end of the stud.

A difficulty that has presented itself to molding the body of plastic material directly on and around the stud has been the liability and almost certainty of ruining the plating of the projecting end of the stud by the rubber compound being forced down over said end in the mold.

By my present invention I am able to manufacture a perfectly satisfactory stopper comprising a plated stud having one end firmly and permanently embedded and anchored in the rubber compound body without passing through it and with the plating of the projecting end of the stud entirely unimpaired. This result I accomplish by the molding process which I shall now describe, reference being had to the accompanying drawings, which illustrate one way of carrying out my method by means of a single-cavity mold, it being understood, of course, that the mold members may have such area and as many cavities as may be desired.

Figure 1:
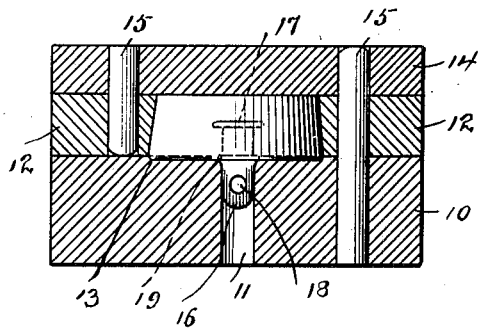
Figure 2:
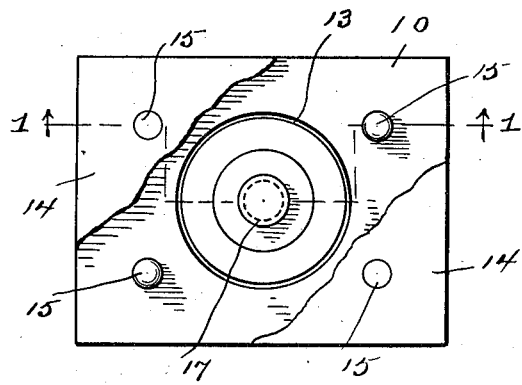
Figure 3:
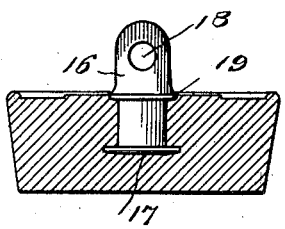

In the accompanying drawings, forming a part of this specification, Figure 1 represents a section through the mold members on line 1 1 of Fig. 2, a molded stopper being shown in the single cavity of the mold; Fig. 2, a plan view, a portion of the upper member of the mold being broken out and a stud being indicated in its seat in the lower end of the mold and ready to have the rubber compound applied thereto; and Fig. 3 represents a sectional view of a completed stopper on a larger scale than the other figures.

Similar reference characters indicate the same or similar parts in all the views.

The mold comprises three members. Of these the lower or base member 10 is formed with a pocket or recess 11 to receive the end of the stud that constitutes the projecting portion or ear of the completed stopper. Preferably this recess extends entirely through the base member. The intermediate member 12 is formed with a cavity or chamber 13, the walls of which will be of any form preferred, according to the shape that is to be possessed by the periphery of the completed stopper-body. The top member 14 serves as the cover; so that when the whole is placed in the usual heated press the mass of rubber compound that has been placed in the chamber or cavity will be pressed and vulcanized to the requisite degree. Suitable dowel-pins 15 are employed to insure proper registration of the members of the mold when assembled.

In carrying out my improved process it is preferable that the stopper be molded while in an inverted position—that is, a position the reverse of that which it will occupy in use. The reason for this will be presently explained.

The stud is indicated at 16 and is in practice of suitable nickel-plated metal. It is formed with an enlargement 17 at one end to serve as an anchor to prevent the possibility of the stud being pulled out from the elastic body. Said enlargement may be of any preferred form. The other end of the stud is formed with a transverse hole 18, which receives the usual ring for connection to a chain. The stud is also formed with a flange 19, which performs an important part in carrying out my improved process. The terms "upper end" and "lower end" of the stud as hereinafter used refer to relative positions as the stud is used (the position indicated in Fig. 3) and not to the position shown in Fig. 1, for, as has been stated, the preferred position for molding is the inverted one.

The top or cover 14 of the mold being removed, a stud 16 is placed with its upper end in the recess 11 of the mold member 10, said stud dropping to position so that its flange 19 effectually closes or completely seals the end of the pocket or recess like a valve closing on its seat. In fact, the coacting faces of the flange 19 and the end of the recess 11 are in practice shaped somewhat like a common form of valve and valve-seat, as indicated in Fig. 1. When the upper end of the stud has been placed as described, its lower end, with the anchoring enlargement 17, projects into the cavity or chamber 13 of the intermediate mold member. A mass of plastic compound is then placed in said chamber 13 and the cover 14 put in place, and the mold is then put in the usual heated press and subjected to the necessary pressure, so that the plastic material will be forced in all directions, it being understood, of course, that the size of the mass placed in the chamber will be slightly in excess of the capacity of the chamber surrounding the stud. The pressure forces the slight excess of material through such crevices as will permit it to pass; but the valve-like operation of the flange 19 completely prevents any of the material from getting access to the end of the stud that is located in the pocket or recess 11, and therefore the plating of said end, which is the exposed end when the stopper is in use, is unimpaired. At the same time the stud is firmly anchored in the plastic body, and said body has no perforation extending through it to detract from its usefulness as a stopper, the elastic body presenting a continuous obstruction to the passage of water.

During the assembling of the parts and the compression of the members of the mold and the vulcanizing of the body the crevices between the members of the mold provide for the escape of air and gases.

After the mold has remained in the press a sufficient length of time it is removed and its three members separated from each other. If the stopper sticks in the intermediate member, it may be readily pushed out of the chamber 13. If the upper end of the stud sticks in the pocket or recess 11, the introduction of a suitable tool will push it out. It is to be understood, however, that in carrying out my process it is not always necessary to employ a mold member 10 having the pocket or recess formed as a hole extending through said member, although it is often more convenient to have said recess so formed. It is also to be understood that I do not limit myself to assembling the members of the mold in the position shown in Fig. 1, since they might be assembled with the members standing vertically instead of horizontally or even with the member 10 uppermost, provided the stud be in such position that its flange 19 acts as a valve to completely seal the entrance to the pocket or recess to prevent the plastic material from escaping past it into the pocket or recess 11.

Having thus described my invention, I claim—

1. The process of making a stopper having a metal stud projecting from the body thereof, consisting in molding plastic material upon one end of the stud, and completely preventing the passage of plastic material to the other end of the stud.

2. The process of making a stopper having a plated metal stud projecting from the body thereof, consisting in molding plastic material upon one end of the stud, and completely preventing the passage of material to the other end of the stud.

3. The process of making a stopper having a plated metal stud provided with an enlargement at one end, consisting in molding plastic material upon the end of the stud having the enlargement, and completely preventing the passage of material to the other end of the stud.

4. The process of making a stopper having a plated metal stud projecting from the body thereof, consisting in fitting a stud having a flange to a mold having a pocket until the flange completely seals the mouth of said pocket, and then molding a mass of plastic material on the end of the stud projecting from said pocket.

5. The process of making a stopper having a metal stud projecting from the body thereof, consisting in molding a mass of plastic compound upon one end of the stud, and completely preventing the said compound from being forced out of the mold upon the outer end of the stud during the molding operation.

In testimony whereof I affix my signature in presence of two witnesses.

HENRY C. FRESHOUR.

Witnesses:
A. M. WOOSTER,
S. W. ATHERTON.